H. W. DYER.
AUTOMOBILE BUMPER.
APPLICATION FILED JUNE 16, 1921.
1,412,047.
Patented Apr. 11, 1922.
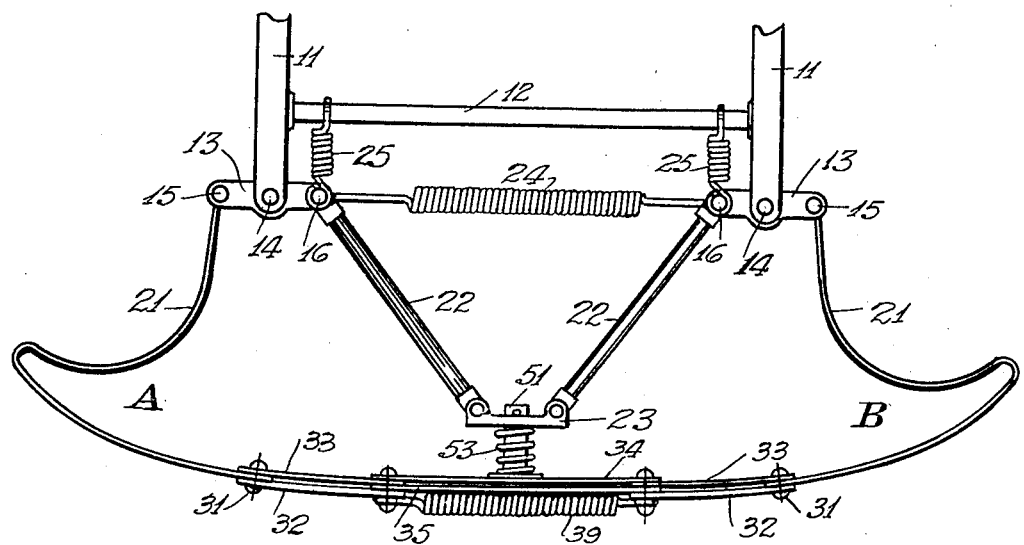
Fig. 1
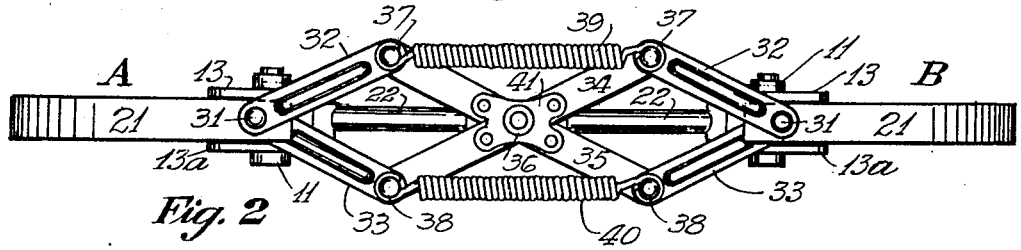
Fig. 2
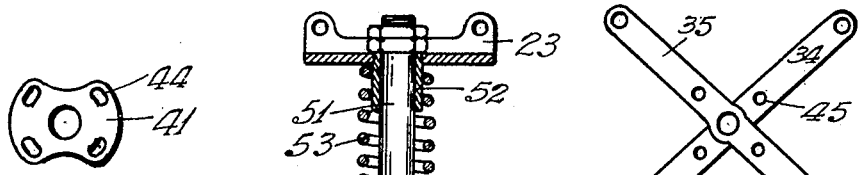
Fig. 3  Fig. 4
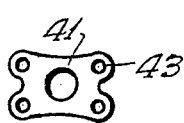
Fig. 6
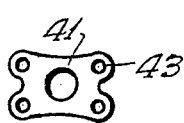
Fig. 7
Fig. 5
Inventor
Harry W. Dyer.
By his Attorney

UNITED STATES PATENT OFFICE.

HARRY W. DYER, OF EAST ORANGE, NEW JERSEY, ASSIGNOR OF ONE-HALF TO MATTHEW H. LOUGHRIDGE, OF BOGOTA, NEW JERSEY.

AUTOMOBILE BUMPER.

1,412,047.    Specification of Letters Patent.    Patented Apr. 11, 1922.

Application filed June 16, 1921. Serial No. 477,869.

*To all whom it may concern:*

Be it known that I, HARRY W. DYER, a citizen of the United States, and a resident of East Orange, in the county of Essex and State of New Jersey, have invented certain new and useful Improvements in Automobile Bumpers, of which the following is a specification.

This invention relates to automobile bumpers of the spring thrust type in which a spring guard extends in the front or in the rear of an automobile and is secured to the chassis frame to act as a guard against colliding with objects in the right of way and it has for an object to provide a bumper of this class including certain novel features whereby an extended area in front of the automobile is guarded by this bumper and this area is provided with coil springs which secure a yielding surface to the object struck. This invention also includes means whereby the bumper may be readily adjusted to cars of different sizes and a means whereby a thrust imparted to any portion of the bumper is distributed throughout the bumper spring. It also includes the use of coil springs in tension to resist the shock created by a collision. Other objects of the invention are more particularly described in the following specification and illustrated in the accompanying drawing in which Fig. 1 is a plan view of one form of my invention applied to an automobile frame, Fig. 2 is a front elevation corresponding to Fig. 1, Fig. 3 is a detail of the centre connection partly in section, Figs. 4 and 5 are details showing the method of adjusting the length of this bumper to various sizes of cars and Figs. 6 and 7 are detailed parts used in combination with Figs. 4 and 5.

This invention includes the use of a lazy-jack or lazy tongs construction supported in front of the car by flat spring members, the ends of which are secured to the chassis frame. The lazy-jack construction is expansible so that the width of the bumper may be varied to suit chassis of varying widths. A horizontal spring is provided between the pivots of the lazy-jack construction. This spring acts as a yielding cushion to any object which the bumper may engage with comparatively little injury to the object. Besides, it maintains a tension on the pivots of the lazy-jack and thereby prevents loose pivots and noise developing in these parts.

The present construction is illustrated in application to a type of bumper as shown in United States Patent #1,375,834, issued to me on the twenty-sixth day of April, 1921. However, the leading principles of this invention can be applied to any type of bumper, whether it uses flat spring members or not, without departing from the intent and spirit of my invention.

Referring to the drawings, it will be noted that each side of the bumper about the centre axis is similarly constructed having similar parts with corresponding reference characters. The chassis frame is represented by 11, with a bar 12 connecting the two sides. The end of this frame may be formed into a jaw to support the floating levers 13 and 13$^a$ pivoted at 14 or brackets similar to those shown in the patent above referred to may be used for securing these floating levers to the chassis frame. A spring 21 is pivoted at 15 to the outer end of the floating levers 13 and 13$^a$ and the inner ends of these levers are pivoted at 16 to the thrust rods 22, the opposite ends of these rods being pivoted to the pad 23. A coil spring 24 may be connected to the pivot 16 between the inner ends of the floating levers 13, with the object of bringing these levers into alignment when the bumper is not under tension. Springs 25 may also be used connecting the pivot 16 with the bar 12 so that these springs are under tension when the springs 21 are pressed inwards.

A lazy-jack (also called a lazy tongs) construction is provided in front of the bumper and secured at each side to springs 21. This construction consists of the arms 32 and 33 pivoted at 31 to the spring 21 and to the opposite ends of these arms the arms 34 and 35 are pivoted at 37 and 38 as shown. These arms are pivoted on a centre boss 36 and when the springs 21 are secured to a narrow frame, the pivot points 31 are moved toward the centre, thereby expanding the arms 34 and 35 as shown in Fig. 4 and when the pivot points 31 are moved away from the centre, these arms are deflected as shown in Fig. 5. This admits of a ready means of adjusting the bumper spring to varying widths of cars and the pantograph arrangement increases the effective area over which the bumper will guard a car using this type of bumper against obstacles in the right of way.

When the bumper has been positioned, a plate 41, Fig. 7, is secured to the centre having holes 43 matching with holes 45 in the arms 34 and 35 and through these holes the cap screws 42, Fig. 3, are inserted, thereby fixing the expansion of the lazy-jack. From Figs. 1 and 2, it will be noted that a horizontal coil spring 39 connects between the pivot points 37 and a coil spring 40 connects between the pivot points 38. These springs also extend forward from the vertical plane of the bumper as shown in Fig. 1 so that an object struck by the bumper will engage these springs first, which yield to the obstruction and being round in section will cause comparatively little damage in removing light objects from the path of the car before the more rigid elements of the bumper as embodied in the arms 34 and 35, become effective to absorb the thrust. These springs also apply tension between the pivot points 37 and 38 tending to turn the arms 34 and 35 into the position shown in Fig. 4. An object engaging the bumper at the side A or B tends to pull the pivot 31 away from the centre and thereby tends to deflect the arms 34 and 35. When a plate 41, similar to Fig. 6, is used with slotted holes 44 for the cap screws 42, a limited motion is provided so that the springs 39 and 40 will yield to this action and thereby absorb part of the thrust applied to the spring 21.

The centres of the arms 34 and 35 are supported by the stem 51 which is preferably made hollow, passing through the sleeve 36 and holding the pad 23 in tension by the coil spring 53. This pad has a sleeve 52 sliding on the stem 51 so that a direct thrust in the centre of the spring is absorbed by the spring 53 and through pad 23 and the thrust rods 22 and levers 13, is transmitted to the springs 21. A thrust imparted to the bumper on either side deflects the spring 21, thereby moving the inner ends of the floating levers 13 outward, applying tension to springs 24 and 25 and through the thrust rods 22 applying compression to the spring 53, thereby distributing the thrust throughout the bumper.

All the parts of this bumper are designed to be constructed of pressed metal and spring steel. The arms 32 and 33 are ridged to increase their rigidity. The plate 41 is made from pressed metal and the holes 43 are arranged to suit the various adjustments of the arms 34 and 35 so that when adjusting this type of bumper for any particular size of car, it is only necessary to have a variety of plates 41 suitable for this purpose. Thus, by an inexpensive construction the bumper is made suitable for a great variety of cars.

Having thus described my invention, I claim:

1. A motor vehicle bumper comprising an impact section consisting of end sections adapted to be attached to the vehicle and an intermediate impact section consisting of a lazy tongs supported between and connecting said end sections.

2. A motor vehicle bumper comprising an impact section consisting of end sections adapted to be attached to the vehicle, a pair of obliquely placed arms secured to said end sections and a coil spring connecting the extremities of said arms.

3. A motor vehicle bumper comprising a comparatively rigid impact member with end sections adapted to be attached to the vehicle, a pair of arms secured to either side of said impact member and a coil spring connecting said arms.

4. A motor vehicle bumper comprising an impact section consisting of end sections adapted to be attached to the vehicle, an intermediate impact section consisting of a lazy tongs connected between said end sections and means for pivotally supporting said lazy tongs on its central members.

5. In a vehicle bumper of the class described, the combination of a pair of horizontal impact members adapted to be secured to the vehicle and a lazy tongs, said lazy tongs supported by said members and supported on its central arm by means independent of said members.

6. In a vehicle bumper of the class described, the combination of a pair of impact members adapted to be secured to the vehicle, and a lazy tongs, said lazy tongs connected between said impact members and means for adjusting the spread of said lazy tongs.

7. In a vehicle bumper of the class described, the combination of a pair of impact members adapted to be secured to the vehicle and a lazy tongs, said members supporting said lazy tongs and means for holding the arms of said lazy tongs in tension.

8. In a vehicle bumper of the class described, the combination of a pair of impact members adapted to be secured to the vehicle, a lazy tongs and a spring, said impact members supporting said lazy tongs and said spring connecting the pivots of said lazy tongs.

9. In a vehicle bumper of the class described, the combination of a pair of impact members adapted to be secured to the vehicle, a lazy tongs and a coil spring, said coil spring connecting the projecting pivots of said lazy tongs.

10. In a vehicle bumper of the class described the combination of a comparatively rigid guard member adapted to be secured to the vehicle, a pair of arms and a coil spring, said arms secured to said guard member and supporting said coil spring.

11. In a vehicle bumper of the class described, the combination of a comparatively rigid guard member adapted to be secured to the vehicle, a pair of arms and a coil spring, said arms secured to said guard and spaced to support said coil spring in a different horizontal plane from said rigid guard.

12. In a vehicle bumper of the class described, the combination of a comparatively rigid guard member adapted to be secured to the vehicle, a pair of arms and a coil spring, said arms secured to said guard member and positioned to support said coil spring in a different vertical plane from said guard member.

13. In a vehicle bumper of the class described, the combination of a pair of guard members adapted to be secured to the vehicle, a lazy tongs and a coil spring, said lazy tongs pivotally supported by said guard members and said coil spring connected to the joints of said lazy tongs.

14. In a vehicle bumper of the class described, the combination of a pair of guard springs adapted to be secured to the vehicle and a lazy tongs, said lazy tongs pivoted to said springs, means providing for a limited expansion of said lazy tongs and means to hold said lazy tongs under tension.

15. In a vehicle bumper of the class described, the combination of a pair of guard springs adapted to be secured to the vehicle, a lazy tongs and a spring-controlled plunger, said lazy tongs connected between the ends of said elliptical springs and said plunger connected to the centre of said lazy tongs.

16. In a vehicle bumper of the class described, the combination of a guard spring, a pair of floating levers pivoted one to each side of the vehicle, the outer ends of said levers connecting to the end of said guard spring, a tension spring, said tension spring connecting the opposite ends of said levers with the vehicle.

17. In a vehicle bumper of the class described, the combination of an impact member, a pair of floating levers pivoted one to each side of the vehicle, one end of each of said springs connecting to one end of each of said levers, a coil spring, said coil spring connecting the opposite ends of said levers.

18. In an automobile bumper of the class described, the combination of an outer guard member, a pair of floating levers pivoted one to each side of the automobile, the outer ends of said guard member connecting to the ends of said levers and a spring to hold the opposite ends of said levers in tension.

19. In a vehicle bumper of the class described, the combination of an outer guard member, a pair of floating levers pivoted one to each side of the vehicle, the ends of said guard member connecting to the outer ends of said levers and means for holding said levers in alignment.

20. In a vehicle bumper of the class described, the combination of an outer guard member, a pair of floating levers pivoted one to each side of the vehicle, the outer ends of said levers pivotally connected to said guard member, a pair of coil springs and means including said coil springs whereby a thrust imparted to said guard member is taken up through a compression and a tension spring.

21. In a vehicle bumper of the class described, the combination of a pair of impact members connecting to the vehicle, a lazy-tongs pivoted to and connecting said members, the spacing of said impact members being adjusted by said lazy tongs.

22. In a vehicle bumper of the class described, the combination of a pair of members secured to the vehicle, a lazy tongs pivoted to said members and a detachable plate for positioning the arms of said lazy tongs.

23. In a vehicle bumper of the class described, the combination of a pair of impact members secured to the vehicle, a lazy tongs, a spring and a plate, said lazy-tongs pivoted to said members and held in tension by said spring, said plate providing for a limited expansion of said lazy tongs.

24. In a vehicle bumper of the class described, the combination of a comparatively rigid guard member adapted to be secured to the vehicle, a pair of arms and a plurality of coil springs, said arm secured to said guard member and supporting said springs horizontally.

Signed at New York city, in the county of New York and State of New York, this 17th day of May, A. D. 1921.

HARRY W. DYER.